United States Patent [19]
Novacek et al.

[11] Patent Number: 5,992,458
[45] Date of Patent: Nov. 30, 1999

[54] LOAD REACTION STEERING UNIT FOR UNEQUAL AREA CYLINDER

[75] Inventors: William J. Novacek, Bloomington; James K. Yip, Richfield, both of Minn.

[73] Assignee: Eaton Corporation, Cleveland, Ohio

[21] Appl. No.: 09/229,713

[22] Filed: Jan. 13, 1999

[51] Int. Cl.$^6$ .................................................. F15B 13/04
[52] U.S. Cl. ........................ 137/625.24; 60/384; 91/467
[58] Field of Search ................................ 60/384; 91/467; 137/625.24

[56] References Cited

U.S. PATENT DOCUMENTS

| | | |
|---|---|---|
| Re. 25,126 | 2/1962 | Charlson . |
| 5,638,864 | 6/1997 | Haarstad et al. .................... 137/625.24 |
| 5,819,532 | 10/1998 | Wang et al. ........................... 91/467 X |

*Primary Examiner*—Gerald A. Michalsky
*Attorney, Agent, or Firm*—L. J. Kasper

[57] ABSTRACT

A fluid controller (15) of the type which controls the flow of fluid to an unequal area steering cylinder (25), wherein the controller is of the load reaction type. The controller (15) includes valving (27) which, when it is in neutral (FIGS. 1 and 5), defines a load reaction fluid path (LR) permitting fluid communication between the control fluid ports (21, and 23) through the fluid meter (29) in response to an external load imposed on the cylinder (25). In accordance with the invention, the valving (27) includes a fluid path (97,95,99, 71,75) between the load reaction fluid path (LR) and the return port (19), when the valving is in neutral. When the rod end chamber (A) is contracting, fluid is drawn from the return port into the load reaction fluid path (LR), preventing cavitation, and when the head end chamber (B) is contracting, fluid flows from the load reaction fluid path (LR) to the return port (19), preventing pressure intensification.

8 Claims, 5 Drawing Sheets

LOAD REACTION STEERING UNIT FOR UNEQUAL AREA CYLINDER

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to fluid controllers for use in vehicle steering systems, and more particularly, to such controllers which are to be used with unequal area steering cylinders.

Conventionally, many vehicles utilizing full fluid linked steering systems have included a pair of steering cylinders, arranged so that, for either direction of steering, fluid would be ported to the head end of one cylinder and to the rod end of the other cylinder, i.e., there would be the same ratio of steering movement to fluid flow for either direction of steering. Unfortunately, such an arrangement is expensive because of the two cylinders and all of the associated plumbing. On some vehicles, it is possible to use a single steering cylinder, but which is of the double rod end type, such that there is inherently the same ratio of steering movement to fluid flow for either direction of steering.

There are now a number of vehicles which utilize full fluid linked steering systems, including fluid controllers of the type to which the present invention relates, wherein it is considered desirable to utilize only one steering cylinder, having only a single rod, and thus referred to as an "unequal area" steering cylinder. An unequal area cylinder is one having only a single rod extending from the cylinder, such that the cylinder has a "rod end" having a particular cross-sectional area subject to fluid pressure ("flow area"), and a "head end" having a relatively larger cross-sectional area ("flow area"). In many vehicle applications, the use of a single, unequal area cylinder is desirable because the linkage arrangement and overall installation is simplified, and therefore, less expensive than is the case for even a double rod end cylinder.

As a separate issue, many vehicle manufacturers prefer to use fluid controllers of the type having "load reaction", a feature whereby, when the fluid controller is in neutral, the control fluid ports (i.e., the ports connected to the steering cylinder) are in fluid communication with the opposite sides of the fluid meter (typically a gerotor gear set). Thus, any external load imposed on the steered wheels will impose a reaction load on the fluid meter which, in turn, will be felt by the vehicle operator through the steering wheel.

Although load reaction is considered a very desirable feature, at least in a number of vehicle applications, there have been many occasions, prior to the present invention, in which vehicle manufacturers have been told that their steering system could not include both load reaction and a single, unequal area steering cylinder. A primary reason has been that the load reaction flow to and from the unequal area cylinder would be greater to and from the head end of the cylinder than it would be to and from the rod end of the cylinder. As a result, with the cylinder communicating to the opposite sides of the fluid meter, there would be pressure intensification occurring while the head end is contracting, and there would be cavitation occurring while the rod end is contracting. In either case, the performance of the controller would not be acceptable. While the pressure intensification could result in burst hoses, and other pressure related problems, cavitation could result in a potential loss of steering control because of voids in the fluid "column".

An additional disadvantage of the prior art load reaction and unequal area cylinder combination is that there is no position of the cylinder corresponding to a neutral position of the vehicle. The unequal area of the head end and rod end, and the balanced forces acting on the rod, mean that the pressure in the rod end is higher than that in the head end, resulting in flow from the rod end to the head end, in the absence of a steering input. This flow causes continual drift of the vehicle and rotation of the steering wheel, a condition which is not acceptable to the vehicle operator.

BRIEF SUMMARY OF THE INVENTION

Accordingly, it is an object of the present invention to provide an improved fluid controller for use with an unequal area steering cylinder, wherein the controller is of the load reaction type, but is able to overcome the pressure intensification and cavitation problems of the prior art controllers.

It is another object of the present invention to provide an improved fluid controller which accomplishes the above-stated object, and at the same time, prevents the occurrence of undesired vehicle drift and steering wheel rotation.

The above and other objects of the invention are accomplished by the provision of an improved fluid controller operable to control the flow of fluid from a source of pressurized fluid to an unequal area fluid pressure operated device. The controller includes housing means defining an inlet port for connection to the source, a return port for connection to a system reservoir, and first and second control fluid ports for connection to the unequal area device. A valve means is disposed in the housing means and defines a neutral position and at least one operating position in which the housing means and the valve means cooperate to define a main fluid path providing fluid communication from the inlet port to the first control fluid port, and from the second control fluid port to the return port, the main fluid path including a fluid meter. In the neutral position, the housing means and the valve means cooperate to define a load reaction fluid path permitting fluid communication between the first and second control fluid ports, through the fluid meter.

The improved fluid controller is characterized by the valve means including means operable to permit fluid communication between the load reaction fluid path and the return port, when the valve means is in the neutral position. As a result, when a load is imposed tending to move the unequal area device in a first direction, fluid is permitted to flow from the load reaction fluid path to the return port. When a load is imposed tending to move the unequal area device in a second direction, fluid is permitted to flow from the return port to the load reaction fluid path.

DETAILED DESCRIPTION OF THE PREFERRED EMBODIMENT

Figure 1:
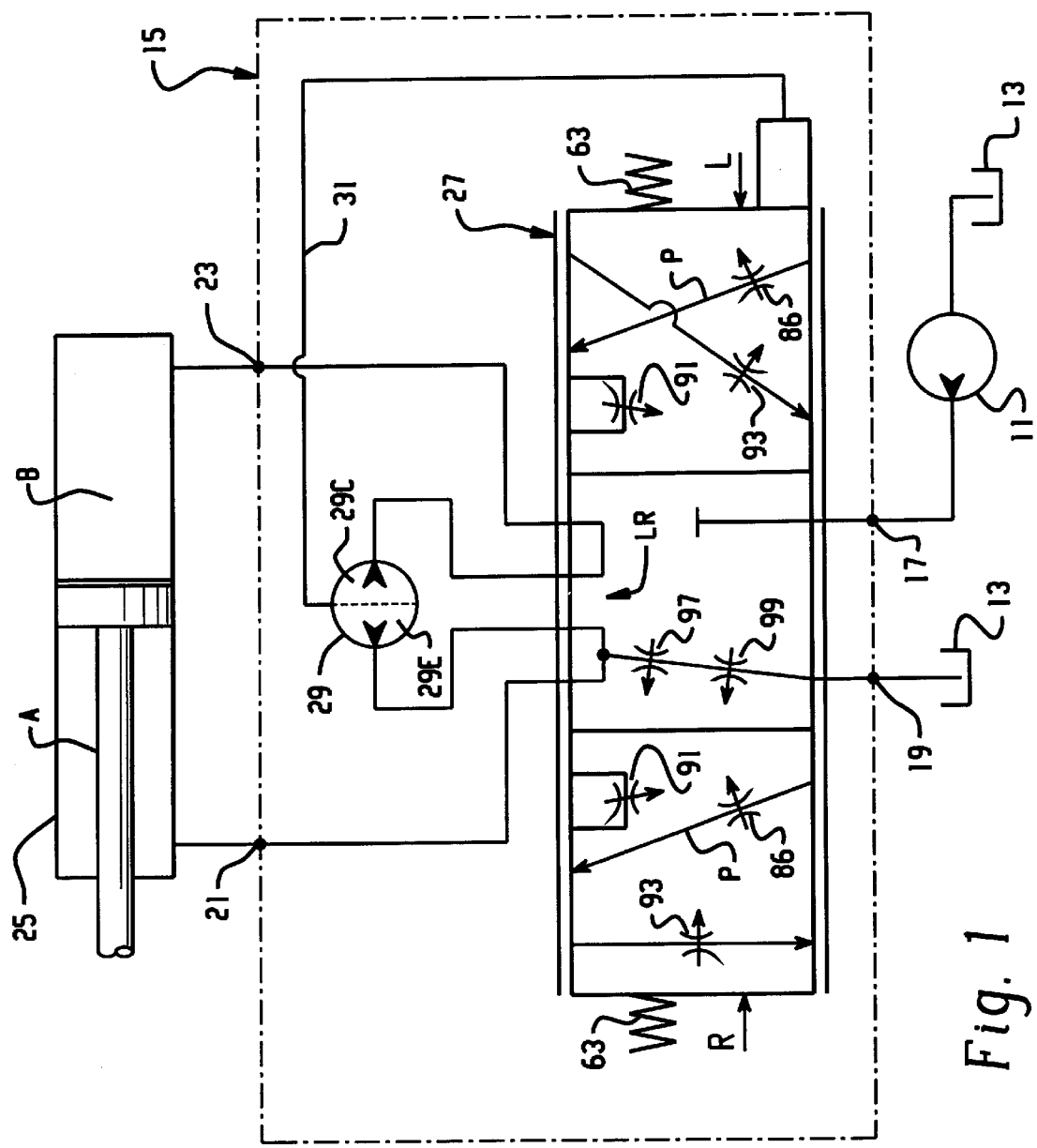
FIG. 1 is a hydraulic schematic of a hydrostatic power steering system including an unequal area steering cylinder.

Referring now to the drawings, which are not intended to limit the invention, FIG. 1 is a hydraulic schematic of a vehicle hydrostatic steering system including a fluid controller made in accordance with the teachings of the present invention. The system includes a fluid pump 11, shown herein as a fixed displacement pump for ease of illustration, having its inlet connected to a system reservoir 13. The output of the pump 11 is directed to the hydrostatic steering system, and more specifically, to a fluid controller 15.

Referring still to FIG. 1, the fluid controller 15 includes an inlet port 17, a return port 19, and a pair of control (cylinder) fluid ports 21 and 23, which are connected to the opposite ends of a steering cylinder 25. In accordance with one aspect of the present invention, the steering cylinder 25 is an unequal area cylinder, i.e., a cylinder which has a "rod end" having a cross-sectional area (flow area) A, and a "head end", having a cross-sectional area (flow area) B, wherein the area B is somewhat greater than the area A.

The fluid controller 15, which will be described in greater detail in conjunction with FIG. 2, may be of the general type illustrated and described in U.S. Pat. No. Re. 25,126, and U.S. Pat. No. 5,638,864, both of which are assigned to the assignee of the present invention and incorporated herein by reference. More specifically, the controller 15 includes a valving arrangement, generally designated 27, which is moveable from its neutral position shown schematically in FIG. 1 to either a right turn position R or a left turn position L. When the valving 27 is in either of the turn positions, the pressurized fluid flowing through the valving 27 also flows through a fluid meter 29, one function of which is to measure (meter) the proper amount of fluid to be communicated to the appropriate control port 21 or 23. As is shown only schematically (in FIG. 1), the fluid meter 29 includes expanding fluid volume chambers 29E, and contracting fluid volume chambers 29C. As is well known to those skilled in the art, the other function of the fluid meter 29 is to provide follow-up movement to the valving 27, such that the valving 27 is returned to its neutral position after the desired amount of fluid has been communicated to the steering cylinder 25. In FIG. 1, this follow-up movement is achieved by means of a mechanical follow-up connection, indicated schematically at 31.

As is shown schematically in FIG. 1, the valving 27 defines a plurality of variable orifices whenever the valving is moved from its neutral position to one of its operating positions, either the right turn position R or the left turn position L. These variable orifices will be described in greater detail subsequently in conjunction with the detailed description of FIGS. 3 through 5.

Fluid Controller 15

Figure 2:
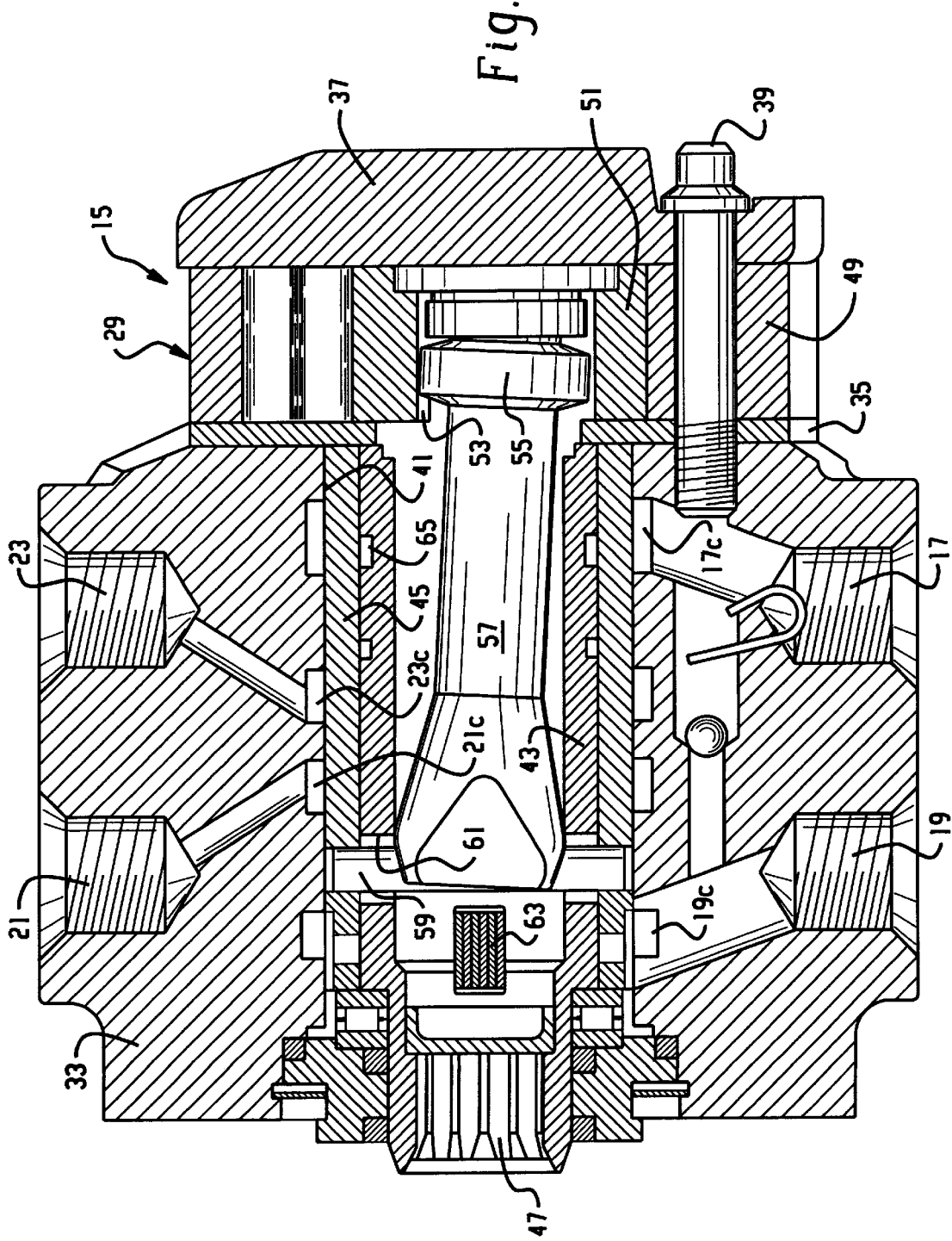
FIG. 2 is an axial cross-section of a fluid controller of the type to which the present invention relates.

Referring now to FIG. 2, the construction of the fluid controller will be described in some detail. The controller 15 comprises several sections, including a housing section 33, a port plate 35, a section comprising the fluid meter 29, and an end plate 37. These sections are held together in tight, sealing engagement by means of a plurality of bolts 39, which are in threaded engagement with the housing section 33. The housing section 33 defines the inlet port 17, the return port 19, and the control ports 21 and 23.

Rotatably disposed within a valve bore 41 defined by the housing section 33 is the valving arrangement 27. The valving 27 comprises a primary, rotatable valve member 43 (hereinafter also the "spool"), and a cooperating, relatively rotatable follow-up valve member 45 (hereinafter also the "sleeve"). At the forward end of the spool is a portion having a reduced diameter and defining a set of internal splines 47 which provide for a direct mechanical connection between the spool 43 and a steering wheel (not shown). The spool 43 and sleeve 45 will be described in greater detail subsequently.

The fluid meter 29 may be of a type well known in the art and includes an internally toothed ring 49, and an externally toothed star 51. The star 51 defines a set of internal splines 53, and in splined engagement therewith is a set of external splines 55, formed at the rearward end of a drive shaft 57. The shaft 57 has a bifurcated forward end permitting driving connection between the shaft 57 and the sleeve 45, by means of a pin 59 passing through a pair of pin openings 61 in the spool 43. Thus, pressurized fluid flowing through the valving 27, in response to rotation of the steering wheel and the spool 43 flows through the fluid meter 29, causing orbital and rotational movement of the star 51 within the ring 49. Such movement of the star 51 causes follow-up movement of the sleeve 45 by means of the drive shaft 57 and pin 59 (which comprise the follow-up connection 31 of FIG. 1). This movement maintains a particular relative displacement between the spool 43 and sleeve 45, for a given, constant rate of rotation of the steering wheel. A plurality of leaf springs 63 extend through an opening in the sleeve 45, biasing the sleeve 45 toward its neutral position, relative to the spool 43.

It may be seen in FIG. 2 that the housing section 33 defines four annular chambers surrounding the sleeve 45, to provide fluid communication between the outer surface of the sleeve 45 and the various ports 17, 19, 21 and 23. The various annular chambers are designated by the reference numeral of the respective port, accompanied by the letter "c".

The toothed interaction of the star 51, orbiting and rotating within the ring 49, defines the expanding and contracting fluid volume chambers 29E and 29C, respectively, and adjacent each chamber, the port plate 35 defines a fluid port (not shown in FIG. 2) as is well known to those skilled in the art. The housing section 33 provides a plurality of axial bores (also not shown in FIG. 2), each of which is in open communication at one end with one of the fluid ports in the port plate 35, and at its other end, with the valve bore 41.

Valving Arrangement 27

Figure 3:
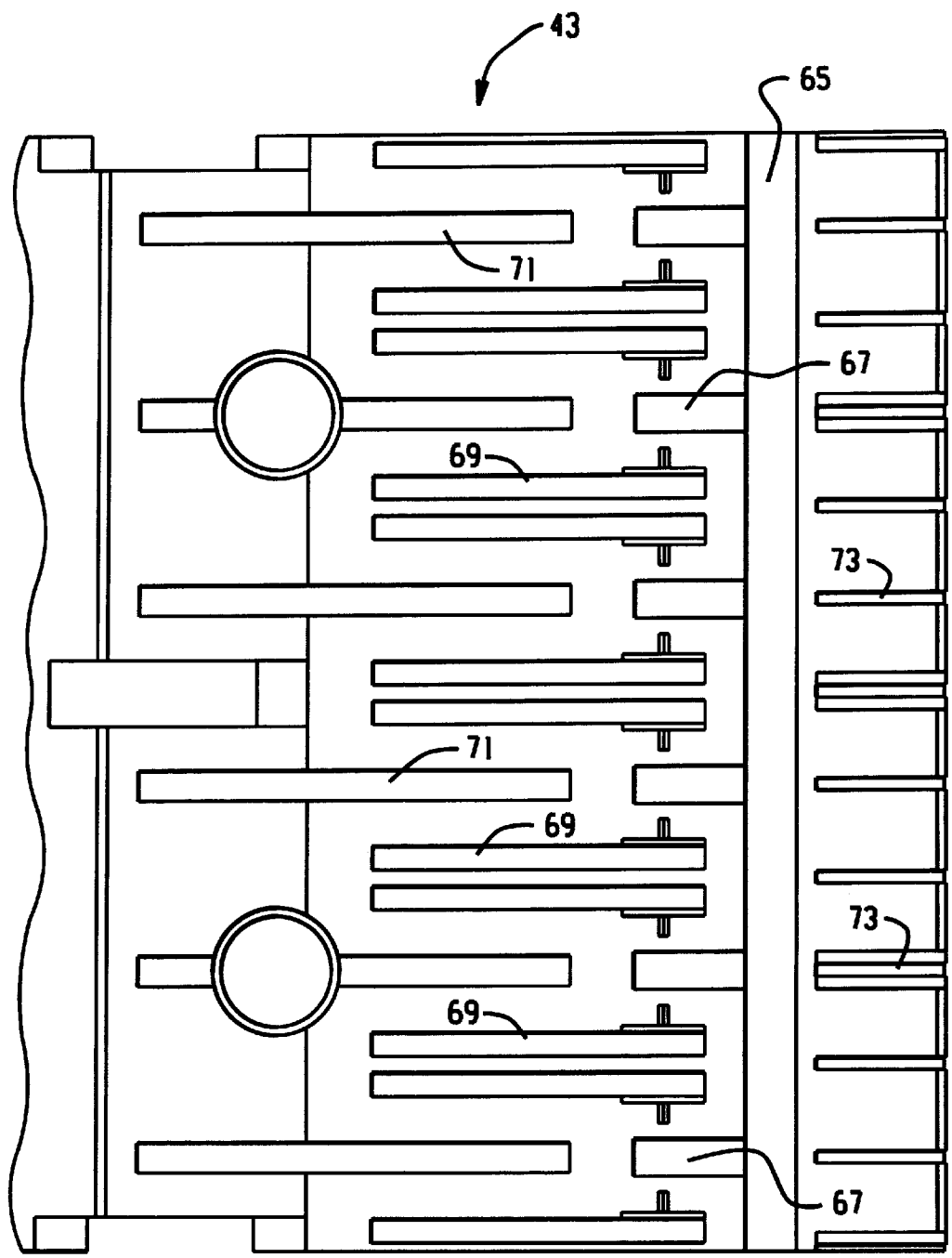
FIG. 3 is a flat view of the spool valve of the fluid controller shown in FIG. 2, but on a larger scale than in FIG. 2.
Figure 4:
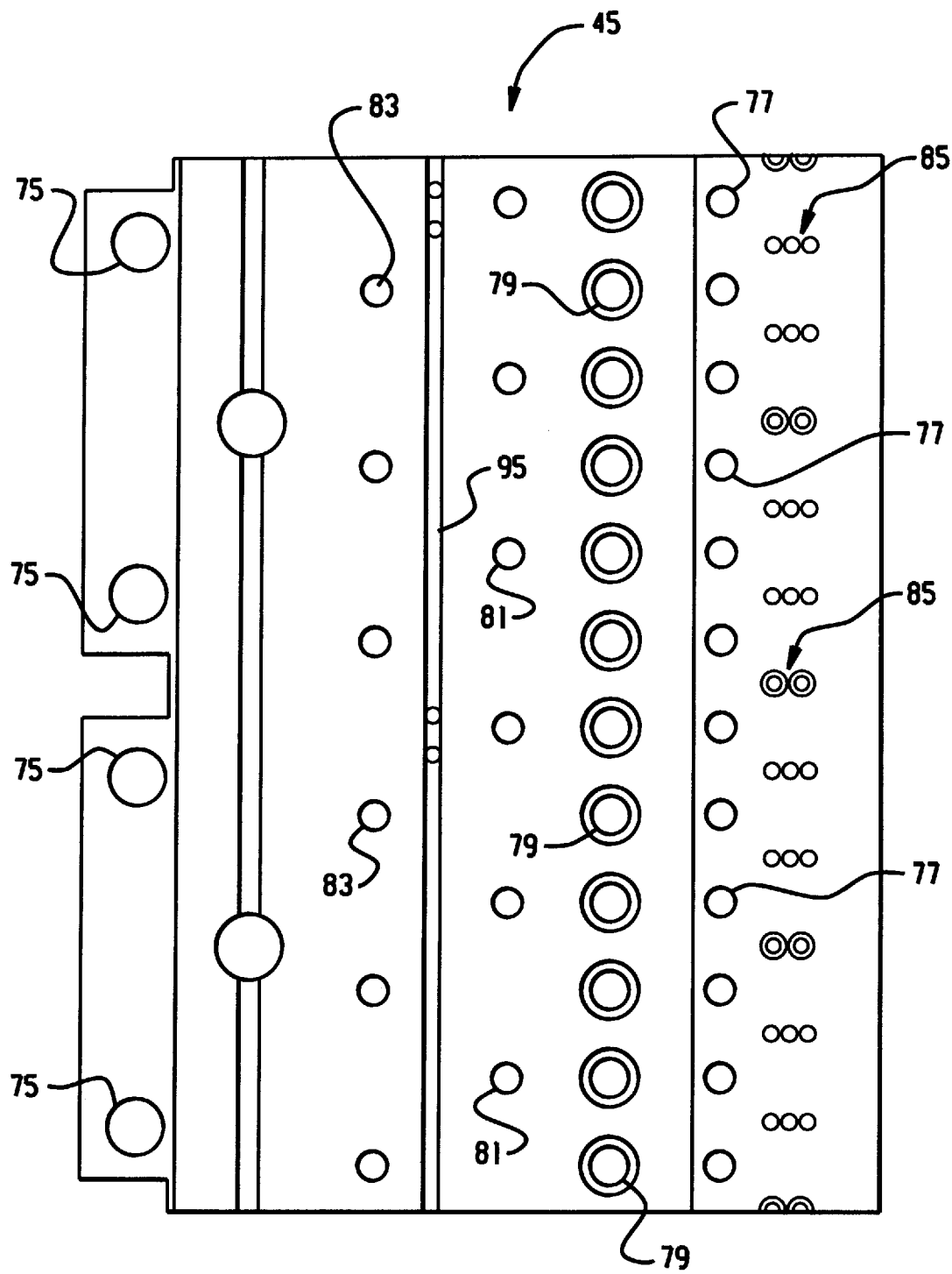
FIG. 4 is a flat view of the sleeve valve of the fluid controller shown in FIG. 2, and on the same scale as FIG. 3.

Referring now primarily to FIGS. 3 and 4, the spool 43 and sleeve 45 will be described in greater detail. It should be noted that FIG. 3 illustrates the outer surface of the spool 43, while FIG. 4 illustrates ports which generally are the same on the inner surface as on the outer surface of the sleeve 45. The spool 43 defines an annular groove 65, and in communication therewith, a plurality of axial slots 67. Circumferentially displaced from each of the axial slots 67 is a longer axial slot 69, and circumferentially aligned with each of the axial slots 67 is an even longer axial slot 71, the function of which will be described subsequently. It should be noted that because the fluid controller of FIG. 2 is of the load reaction type, each of the axial slots 69 is actually a pair of parallel axial slots. To the right of the annular groove 65, the spool 43 defines a plurality of axial, open-center slots 73, each of which is in open communication, toward its right end, with the interior of the spool 43. Other structural details of the spool 43 which are well known but are not relevant to the present invention will not be described.

Toward the left end in FIG. 4, the sleeve 45 defines a plurality of tank ports 75, in communication with the return port 19 in a manner well known in the art. Toward the right end, the sleeve 45 defines a plurality of pressure ports 77, in communication with the annular chamber 17c. To the left of the ports 77 is a plurality of meter ports 79, which communicate between the valving arrangement 27 and the expanding and contracting volume chambers, 29E and 29C, respectively, of the fluid meter 29. In the subject embodiment, and by way of example only, the star 51 has six (N) external teeth, and the ring 49 has seven (N+1) internal teeth, so there are twelve (2N) of the meter ports 79. Disposed to the left of the meter ports 79 is a plurality of cylinder ports 81, in communication with the annular chamber 23c, and further to the left, a plurality of cylinder ports 83, in communication with the annular chamber 21c. The sleeve 45 also defines a plurality of open center holes 85, which, like the pressure ports 77, are in communication with the inlet port 17 through the annular chamber 17c, the function of the open center holes 85 to be described subsequently.

Operation of Valving 27

Figure 5:
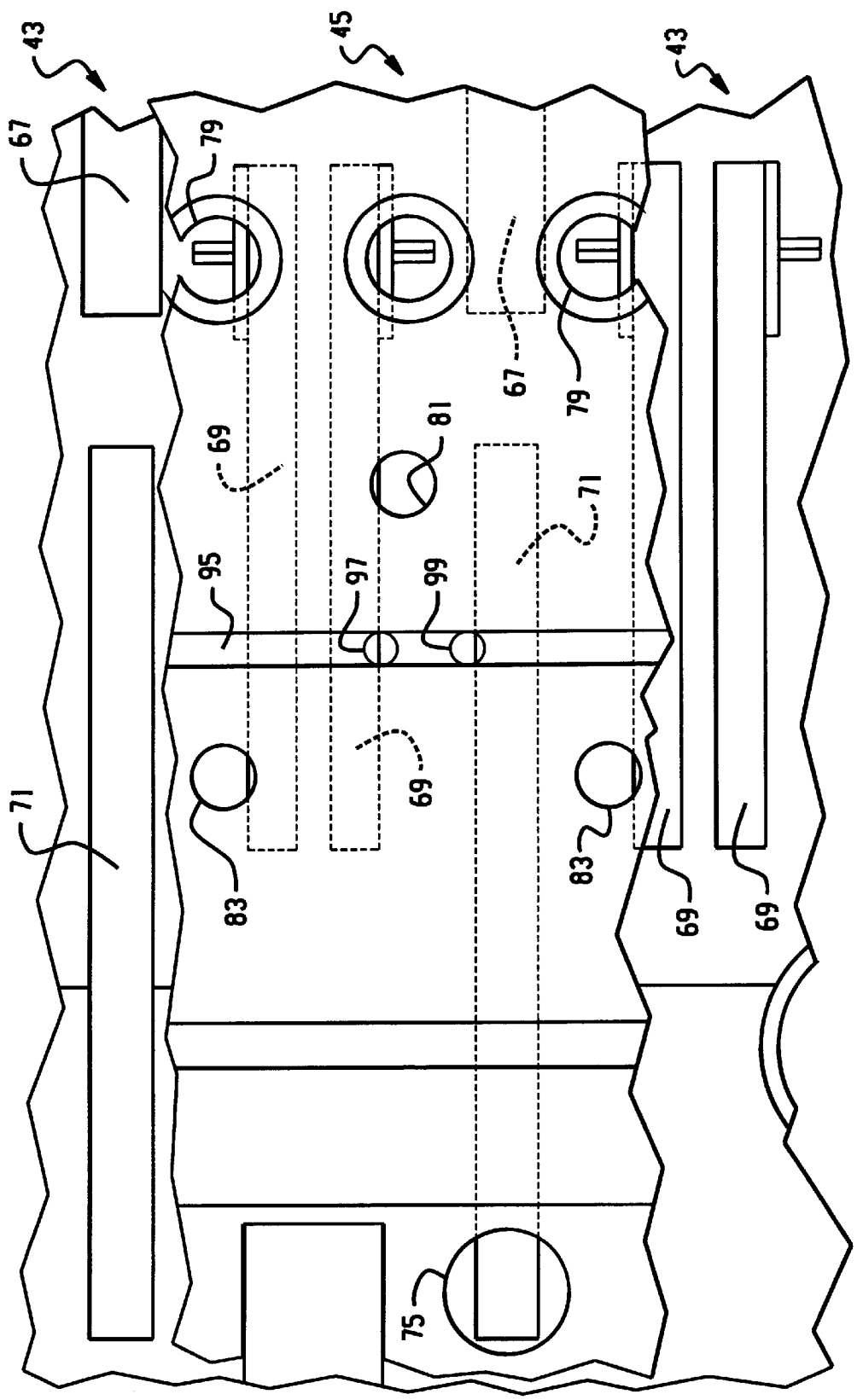
FIG. 5 is a greatly enlarged, fragmentary overlay view of the valving shown in FIGS. 3 and 4, with the valving in its neutral, load reaction position.

It is believed that the basic operation of the controller 15 and the valving 27 described thus far should be readily apparent in view of the teachings of the above incorporated patents. However, the operation of the controller and valving will be described briefly, partly to relate the structure illustrated in FIGS. 2, 3, and 4 to the schematic of FIG. 1. The operation of the valving will be described in connection with FIGS. 3 through 5, in which FIG. 5 is an enlarged (relative to FIGS. 2–4), fragmentary overlay views of the spool 43 (dashed lines), and the sleeve 45 (solid lines, but showing only those features on the inside surface of the sleeve, except where otherwise noted).

When the valving 27 is in the neutral position (no rotation of the steering wheel), inlet fluid is communicated from the inlet port 17 into the annular chamber 17c. The pressure ports 77 are in open communication with the annular chamber 17c, but there is no flow through the pressure ports 77 because, in the neutral position, pressurized fluid in the ports 77 is not able to build pressure in any of the slots or grooves defined by the spool 43. Instead, inlet fluid flows from the annular chamber 17c through the open center holes 85, and through the axial slots 73, in a manner well known to those skilled in the art, eventually reaching the system reservoir 13. The load reaction condition which occurs when the valving is in neutral will be described subsequently.

Referring now to FIG. 1, in conjunction with FIGS. 3 and 4, when the steering wheel is rotated counterclockwise (a left turn condition), the spool 43 is displaced from its neutral position, relative to the sleeve 45, the open center holes 85 move out of fluid communication with the open center slots 73, and fluid begins to flow through the pressure ports 77 and into the axial slots 67, and therefore, with every other one of the meter ports 79. In an open-center controller, the cumulative area of the pressure ports 77 comprises a main flow control orifice, shown schematically at 86 in FIG. 1, and also referred to as the A1 orifice. At the same time, each of the axial slots 67 begins to communicate with one of the meter ports 79, the area of overlap therebetween defining a variable orifice, and the composite of these comprising a variable flow control orifice (the A2 orifice). Every other meter port 79 is in communication with an axial slot 67, and the alternate meter ports 79 are now in communication with the longer axial slots 69. The area of overlap between each of these meter ports 79 and the respective axial slots 69 defines a variable orifice, and the composite of these comprises a variable flow control orifice (the A3 orifice).

With the spool 43 and the sleeve 45 in the position shown as L in FIG. 1, each of the slots 69 begins to communicate with an adjacent one of the cylinder ports 83, the overlap therebetween defining a variable orifice, and the composite of these individual orifices comprising a variable flow control orifice 91 (the A4 orifice). As is well known to those skilled in the art, the cylinder ports 83 are in communication, by means of the annular chamber 21c with the cylinder port 21, and then with the rod end A of the cylinder 25. Fluid returning from the head end B of the cylinder 25 enters the cylinder port 23, then flows through the annular chamber 23c, and then through the cylinder ports 81 which are now in fluid communication with the axial slots 71. The area of overlap of the ports 81 and the slots 71 defines a variable orifice, the composite of these individual variable orifices comprising a variable flow control orifice 93 (the A5 orifice). Therefore, the flow path through the variable flow control orifices A1, A2, A3, A4 and A5, as just described, comprises the "main fluid path" in the left turn condition.

Load Reaction

Referring now primarily to FIG. 5, but in conjunction with FIG. 1, the load reaction feature of the controller 15 will be described. With the valving 27 in the neutral position of FIG. 5, the top axial slot 69 is in fluid communication with its adjacent meter port 79, and with the cylinder port 83, which in turn communicates with the control port 21. At the same time, the bottom axial slot 69 is in fluid communication with its adjacent meter port 79, and with the cylinder port 81, which in turn communicates with the control port 23. The resulting flow path between the ports 21 and 23, through the port 81, the slot 69, the port 79, the meter 29, the other port 79, the other slot 69, and the port 83, comprises the load reaction fluid path, designated LR in FIG. 1. Thus, with the valving 27 in neutral, an external load on the steering cylinder 25 will force fluid to move through the load reaction fluid path LR in one direction or the other, depending on the direction of the imposed load.

For example, if the imposed load tends to move the rod to the left in FIG. 1, the rod end chamber A will contract, forcing fluid from the port 21 through the path LR and out the port 23 to the head end chamber B. However, as mentioned previously, the amount of fluid forced out of the rod end chamber will not be enough to fill the head end chamber, and cavitation will occur. On the other hand, if the imposed load tends to move the rod to the right in FIG. 1, the head end chamber B will contract, forcing fluid from the port 23 through the path LR and out the port 21 to the rod end chamber A. However, as was also mentioned previously, the amount of fluid forced out of the head end chamber will be too much for the rod end chamber, and pressure intensification will occur.

In accordance with an important aspect of the invention, when the controller 15 is operating in the load reaction mode, an additional fluid path is provided, connecting the load reaction fluid path LR with a source of lower pressure fluid, which would typically be the return port 19, or at least the case drain region of the controller. In order to accomplish this additional fluid path, the outer surface of the sleeve 45 is provided with an annular groove, the significance of which will be explained further. The sleeve 45 is also provided with a pair of bores 97 and 99. Preferably, there are two sets of the bores 97 and 99, diametrically disposed, and hence, the annular groove 95 provides open communication among the bores.

The bore 97 is in at least partial communication with the bottom axial slot 69, and therefore, is in communication with the load reaction fluid path LR. The bore 99 is in at least partial communication with the axial slot 71 which, with the valving in neutral, is in wide open fluid communication with the tank port 75, and therefore, with a source of low pressure fluid, such as the reservoir 13, through the return port 19. In FIG. 1, the orifices defined by the overlap between the bores 97 and 99 and the slots 69 and 71, respectively, bear the reference numerals of the bores. If a load is imposed on the steering cylinder 25 tending to move the rod to the left in FIG. 1, fluid is forced from the rod end chamber A through the port 21, then through the load reaction fluid path LR to the head end chamber B. However, the tendency to pull a vacuum in the chamber B, because it is larger, will result in fluid being drawn from the reservoir 13, through the port 75, then through the axial slot 71, then the bore 99, the groove 95, and the bore 97, into the slot 69, and out the cylinder port 81 to the control port 23 to prevent any cavitation in the chamber B.

If a load is imposed on the steering cylinder 25 tending to move the rod to the right in FIG. 1, fluid is forced from the head end chamber B through the port 23, then through the load reaction fluid path LR to the rod end chamber A. However, the tendency to intensify pressure in the chamber A, because it is smaller, will result in fluid in the load reaction fluid path LR flowing out through the bore 97, through the groove 95 and the bore 99, into the slot 71, and out the tank port 75 to the reservoir 13 to prevent any intensification of pressure in the chamber A.

It should be apparent to those skilled in the art, in view of a reading and understanding of this specification, that the sizes of the bores 97 and 99, relative to the sizes of other ports and slots, is somewhat dependent upon the ratio of the rod end chamber A to the head end chamber B. For example, the closer are the areas of A and B, the smaller can be the bores and orifices 97 and 99. Conversely, the greater the difference between the areas A and B, the larger should be the bores and orifices 97 and 99. It is believed to be within the ability of those skilled in the art to select the sizes of the bores 97 and 99.

As soon as the steering wheel is rotated, displacing the spool 43 relative to the sleeve 45, either the communication of the bore 97 and the slot 69 will decrease toward zero, or the communication of the bore 99 and the slot 71 will decrease toward zero. In either direction of operation, it would be typical for the load reaction fluid path LR to discontinue within several degrees of rotation between the spool and sleeve, with the additional fluid path to or from the reservoir, in accordance with this invention, also being discontinued.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fluid controller operable to control the flow of fluid from a source of pressurized fluid to an unequal area fluid pressure operated device; said controller including housing means defining an inlet port for connection to said source, a return port for connection to a system reservoir, and first and second control fluid ports for connection to said unequal area device; valve means disposed in said housing means and defining a neutral position and at least one operating position in which said housing means and said valve means cooperate to define a main fluid path providing fluid communication from said inlet port to said first control fluid port, and from said second control fluid port to said return port, said main fluid path including a fluid meter; in said neutral position, said housing means and said valve means cooperating to define a load reaction fluid path permitting fluid communication between said first and second control fluid ports, through said fluid meter; characterized by:

(a) said valve means including means operable to permit fluid communication between said load reaction fluid path and said return port, when said valve means is in said neutral position; whereby:
  (i) when a load is imposed tending to move said unequal area device in a first direction, fluid is permitted to flow from said load reaction fluid path to said return port; and
  (ii) when a load is imposed tending to move said unequal area device in a second direction, opposite said first direction, fluid is permitted to flow from said return port to said load reaction fluid path.

2. A fluid controller as claimed in claim 1, characterized by said fluid pressure operated device comprising a cylinder having a head end chamber, and a rod end chamber; in said first direction, said head end chamber is contracting, and in said second direction, said rod end chamber is contracting.

3. A fluid controller as claimed in claim 1, characterized by said fluid meter including means operable to impart follow-up movement to said valve means proportional to the volume of fluid flow through said main fluid path and said fluid meter.

4. A fluid controller as claimed in claim 1, characterized by said valve means comprising a primary, rotatable valve member, and a cooperating, relatively rotatable follow-up valve member; said primary and follow-up valve members defining said neutral position relative to each other.

5. A fluid controller as claimed in claim 4, characterized by said follow-up valve member being generally cylindrical and disposed in a surrounding relationship relative to said primary valve member, said follow-up valve member defining a first meter port in fluid communication with an expanding volume chamber of said fluid meter, and a second meter port in fluid communication with a contracting volume chamber of said fluid meter.

6. A fluid controller as claimed in claim 5, characterized by said follow-up valve member further defining a first cylinder port in fluid communication with said first control fluid port, and a second cylinder port in fluid communication with said second control fluid port.

7. A fluid controller as claimed in claim 6, characterized by said primary valve member defining a first fluid passage in fluid communication with said first and second meter ports, and with said first and second cylinder ports when said valve means is in said neutral position, said first fluid passage and said meter ports and said cylinder ports comprising said load reaction fluid path.

8. A fluid controller as claimed in claim 7, characterized by said follow-up valve member defining a tank port, and said primary valve member defining a second fluid passage in fluid communication with said tank port when said valve means is in said neutral position, said means operable to permit fluid communication between said load reaction fluid path and said return port comprises said follow-up valve member defining a third fluid passage permitting fluid communication between said first fluid passage and said second fluid passage when said valve means is in said neutral position.

* * * * *